Patented July 4, 1933

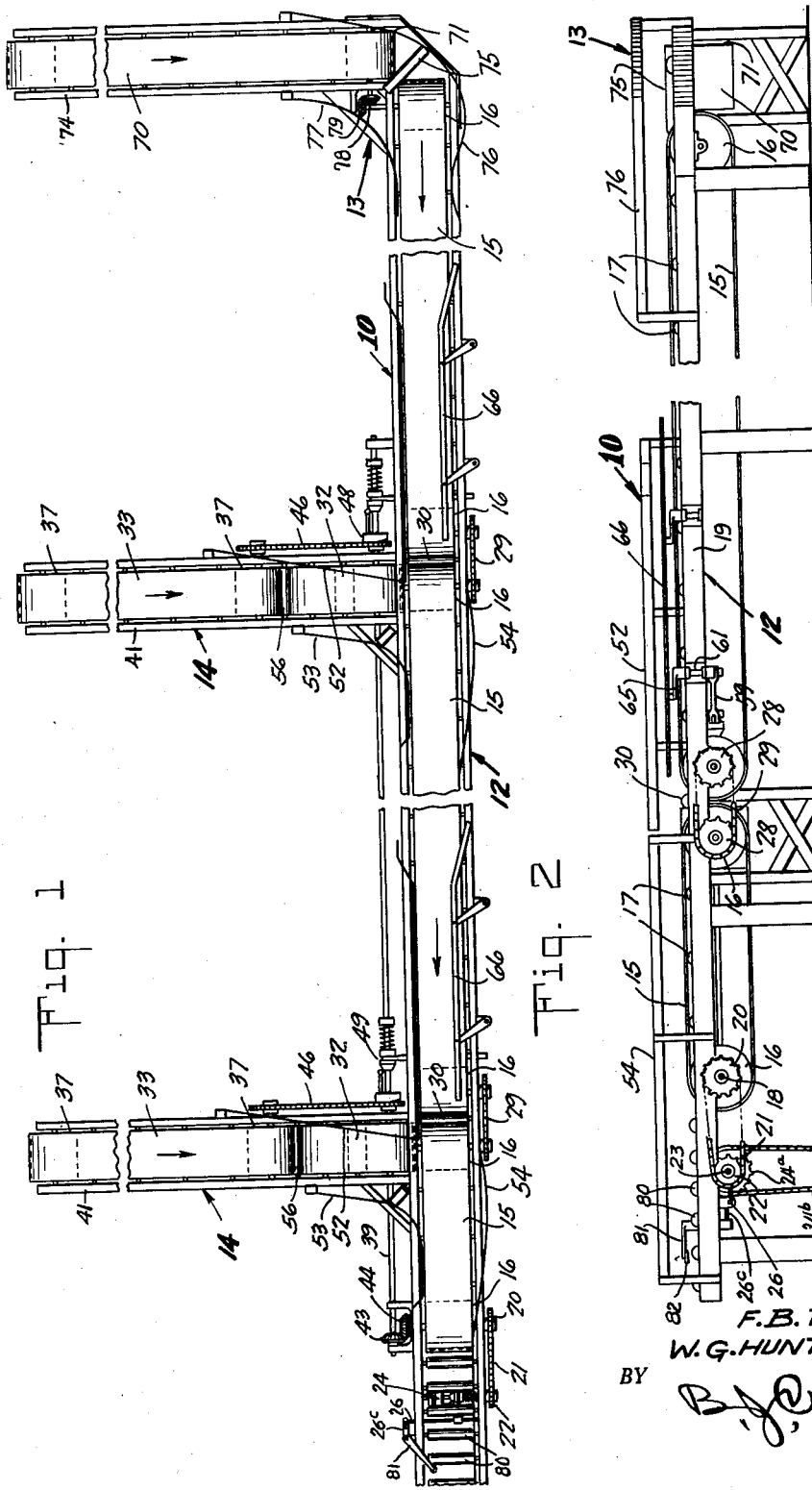

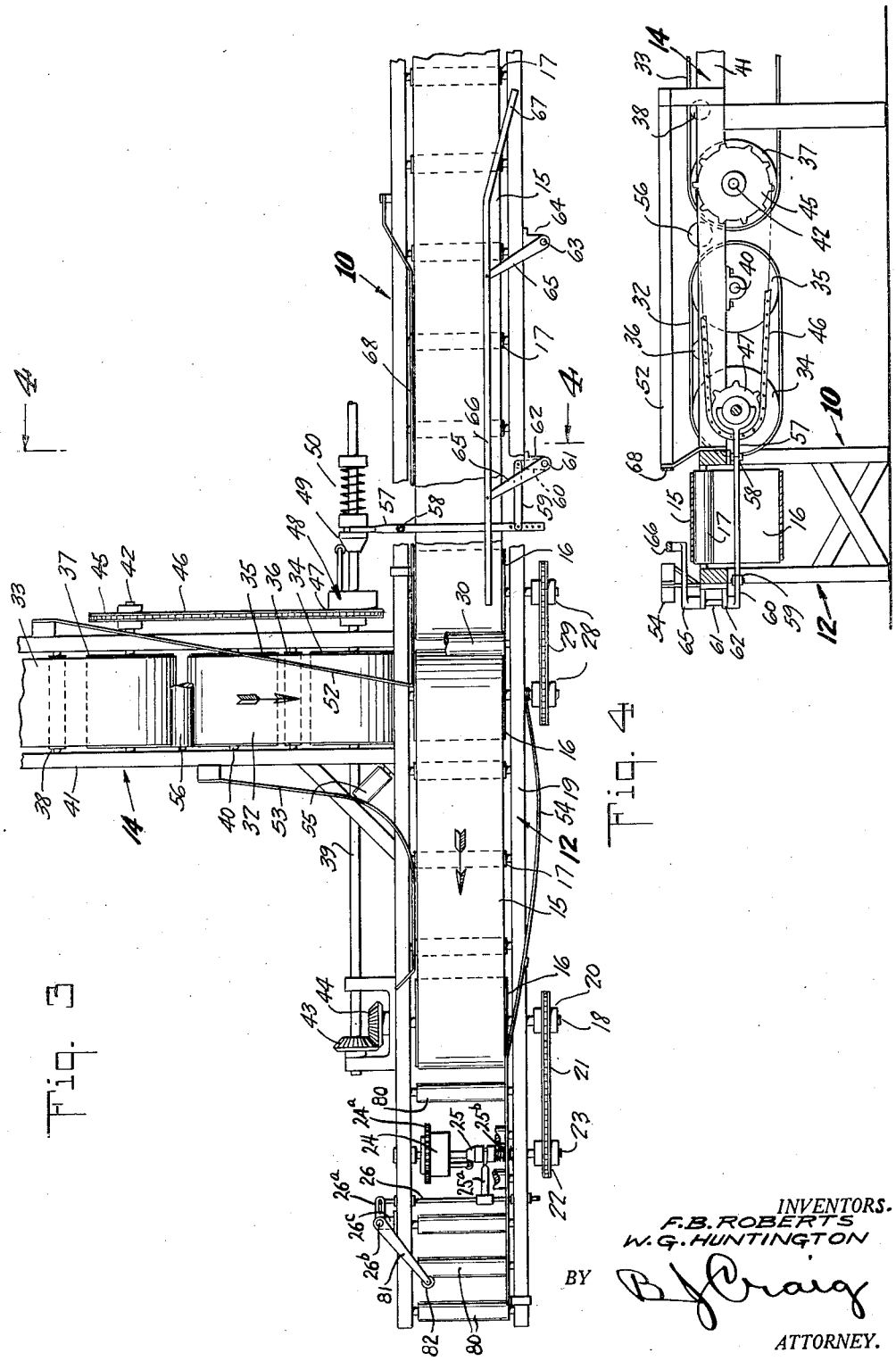

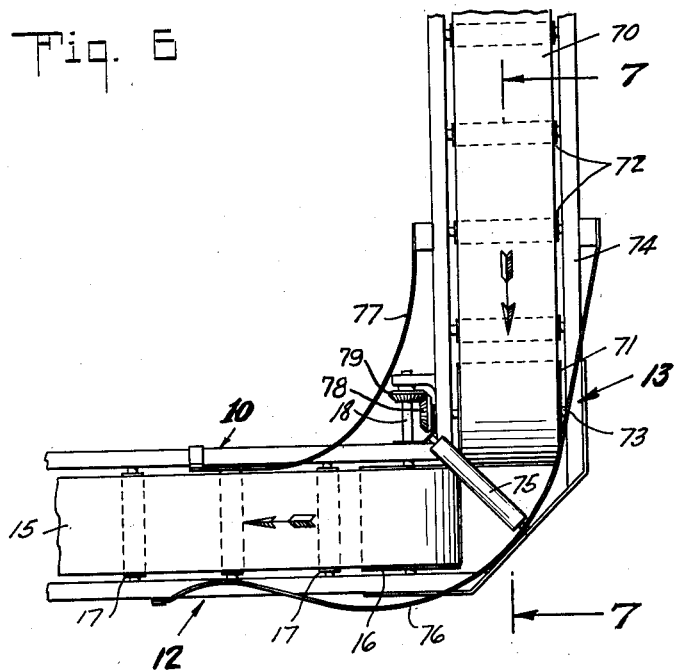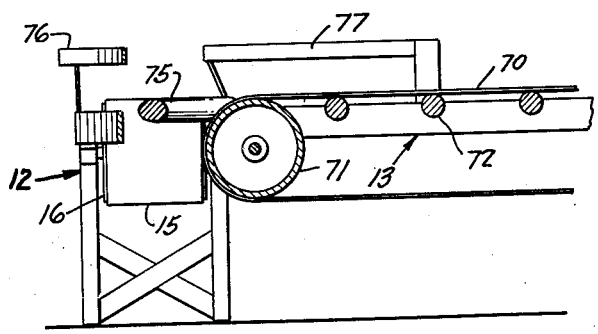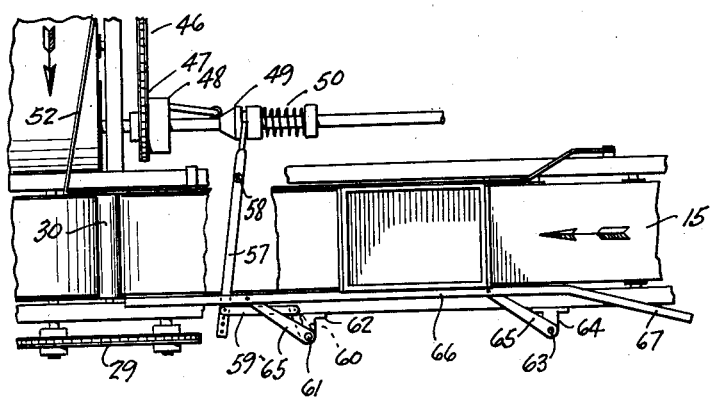

1,916,532

UNITED STATES PATENT OFFICE

FRANK B. ROBERTS AND WILLIS G. HUNTINGTON, OF ANAHEIM, CALIFORNIA, ASSIGNORS TO FOOD MACHINERY CORPORATION, OF SAN JOSE, CALIFORNIA, A CORPORATION OF DELAWARE

CONVEYER MECHANISM

Application filed March 13, 1929. Serial No. 346,617.

This invention relates to improvements in conveyers.

The general object of the invention is to provide a novel conveyer system including a plurality of lateral lines adapted to feed onto a main line wherein automatic means is provided for controlling the feed from the laterals to the main line.

A further object of the invention is to provide a conveyer system including a main line and a lateral with an improved means for driving and controlling the laterals.

Another object of the invention is to provide guiding means for guiding an article passing from a lateral to the main line.

Other objects and the advantages of this invention will be apparent from the following description taken in connection with the accompanying drawings wherein:

Fig. 1 is a top plan view of a conveyer system showing our improved construction.

Fig. 2 is a side elevation of the main conveyer line shown in Fig. 1.

Fig. 3 is an enlarged top plan view of a portion of the conveyer system.

Fig. 4 is a section taken on line 4—4 of Fig. 3.

Fig. 5 is a fragmentary top plan view of the conveyers showing the lateral control clutch in a released position.

Fig. 6 is an enlarged top plan view of our improved corner and

Fig. 7 is a section taken on line 7—7 of Fig. 6.

Referring to the drawings by reference characters we have indicated our improved conveyer system generally at 10. As shown this conveyer system comprises a main line 12 which includes a corner 13 where the conveyed articles pass from an end lateral to the main line, and a plurality of lateral lines 14 which are adapted to feed to the main line.

The main line 12 includes a plurality of continuously moving endless belts 15 positioned on drums 16 and supported intermediate the drums on rollers 17. The drums 16 are mounted on shafts 18 which together with the rollers 17 are adapted to be supported in any suitable type of bearing on a supporting frame 19. The first drum shaft 18 has a sprocket wheel 20 secured thereto which is adapted to be driven by a chain 21 from a sprocket 22 mounted on a shaft 23. The shaft 23 is shown as adapted to be driven by a clutch 24 which includes a sprocket wheel 24ª which is adapted to be driven by a sprocket chain 24ᵇ from any suitable source of power. As shown, the clutch mechanism includes an operating spool 25 loosely mounted on the shaft 23 and for actuating the spool 25 there is provided an arm 25ª secured to a shaft 26 which is pivotally connected at one end to a lever 26ª which is shown as secured to a shaft 26ᵇ positioned in a bearing 26ᶜ on the frame 19. The spool 25 is adapted to be normally urged toward the clutch by a coiled spring 25ᵇ surrounding the shaft 23.

The shafts 18 of adjacent drums 16 each have secured thereto a sprocket wheel 28 and each adjacent pair of sprocket wheels 28 are connected by a sprocket chain 29.

Thus when the clutch 24 is moved into position to operate the shaft 23 the sprocket wheel 22 will drive the sprocket 20 through the medium of the sprocket chain 21 thereby driving the first drum 16. The first drum 16 will, through the medium of the belt 15 drive the other drum at the opposite end of the belt which through the medium of the sprockets 28 and sprocket chain 29 will drive the first drum of the second section. The last drum of each section will drive the first drum of each preceding section throughout the straight length of the main conveyer, thereby causing all the sections to travel at a uniform speed.

If desired an idler roller 30 may be positioned between each of the adjacent drums 16 to provide a supporting means therebetween for articles on the conveyer.

The lateral lines 14 preferably intersect the main line at points adjacent the driving drums 16 as clearly shown in Figs. 1, 3 and 5, so that an article entering the main line from a lateral will not cause the belt 15 to be pushed to one side.

The lateral lines 14 each include a continuously moving intermediate conveyer preferably in the form of a short endless belt section 32 adjacent the main line and located between it and an intermittently moving belt section 33. Each belt 32 is mounted on spaced drums 34 and 35 (Figs. 3 and 4) and is adapted to be supported intermediate the drums by a roller or rollers 36. Each belt 33 is mounted on spaced drums 37 and is adapted to be supported intermediate the drums by a plurality of rollers 38. The drums 34 and 35 are mounted on shafts 39 and 40 which together with the roller 36 are adapted to be supported in any suitable type of bearing on a supporting frame 41 while the drums 37 are mounted on shafts 42 which together with the rollers 38 are also mounted in bearings on the frame 41.

The shaft 39 is adapted to drive all the laterals 14 and is shown as having secured thereto adjacent one end a bevel gear 43 which is adapted to mesh with a bevel gear 44 on the shaft 18 of the first main line drum 16. Thus when the main line is operating the short belt sections 32 of each of the laterals will also operate.

The main belt sections 33 of the laterals are each adapted to be driven by a sprocket wheel 45 secured to the drum shaft 42 of the first drum 37. Each of the sprocket wheels 45 is adapted to be driven by a sprocket chain 46 which is driven by a sprocket wheel 47 of a clutch unit 48.

Each of the clutch units 48 include an operating spool 49 which is adapted to be normally urged by a coiled spring 50 to a position to close the clutch for driving the sprocket wheel 47.

The sprocket wheel 47 is preferably smaller than the sprocket wheel 45 so that the main belt section 33 of each lateral will be driven at a slower rate of speed than the short belt section 32.

For guiding articles from the lateral lines 14 onto the main line we provide guide rails 52, 53 and 54 which are adapted to turn an article as it passes from a lateral onto the main line. As shown, each guide rail 52 on the approach side of the laterals is substantially straight and extends from a point in the rear and to the outside of the belt 32 to a point adjacent the main line belt and adjacent the center of the belt 32. The guide rail 53 on the opposite side of the laterals extends from a point outside and adjacent the rear of the belt 32 approximately parallel to the guide rail 52 and is then curved, after which it becomes straight and extends parallel to the main line for a distance. The guide rail 54 is adapted to straighten articles which come from the laterals onto the main line and is preferably curved as shown. For supporting a portion of the article as it turns we provide an idler roller 55 and to help support an article as it passes from the main lateral belt 33 onto the short lateral belt 32 we preferably provide an idler roller 56.

For operating the clutch spools 49 we provide adjacent each of the laterals 14 a trip mechanism which includes a lever 57 pivoted as at 58. One end of the lever 57 engages the spool 49 while the opposite end portion has the end of a link 59 pivotally secured thereto as clearly shown in Figs. 3 and 5. The opposite end of the link 59 is pivotally connected to an arm 60 disposed below the conveyer belt and which is secured to a shaft 61 mounted in a bearing 62 which is secured to the frame 19.

Spaced from the shaft 61 we provide a similar shaft 63 which is mounted in a bearing 64 secured to the frame 19. Secured to the shafts 61 and 63 we provide arms 65 disposed above the conveyer belt and which are pivotally secured to and adapted to support a bar 66 which is bent outward at one end as at 67. The coiled spring 50 through the medium of the various levers is adapted to normally maintain the bar 66 in the path of an article on the main line, and to prevent the bar 66 from pushing an article off the belt 15 and to assure correct actuation of the trip we provide a guide rail 68 opposite the bar 66.

As an article such as a box which is being conveyed on the main line belt reaches the bar trip mechanism it engages the bent end 67 of the bar 66 and moves the bar outward as it moves along, thereby swinging the arms 65 outward and causing the shaft 61 to rotate, which through the medium of the arm 60 and link 59, swings the lever 57 on its pivot, thereby moving the clutch spool 49 against the action of the spring 50 to a position whereby the clutch 48 does not drive the sprocket 47 whereupon the main lateral belt 33 will stop. The box on the main line 15 will hold the bar in this position until it reaches the lateral whereupon the spring 50 will move the spool 49 to a position to drive the sprocket 47 and will through the medium of the various levers return the bar 66 to its position in the path of travel of an article on the main line.

The length of the bar 66 is sufficient to allow a box which just moves onto the short lateral belt 32 at the same time a box operates the trip mechanism, to be fully transferred to the main belt 15 before the box on the main belt 15 reaches the lateral.

By having the short lateral belts 32 travel faster than the long lateral belts 33, articles may be placed on the belts 33 in close relationship or in engagement with one another but as each preceding article reaches the short belt 32 it is moved away from the succeeding article, thereby providing space therebetween and preventing the articles from becoming jammed together as they turn onto the main line.

The main line corner 13 is constructed to allow free turning of the articles being conveyed and to prevent excessive drag on the belts, and includes a main line endless belt 70 positioned at an angle to the main line belt 15. The belt 70 is mounted on spaced drums 71 and supported intermediate the drums on rollers 72. The drums 71 are mounted on shafts 73 which together with the rollers 72 are adapted to be supported in any suitable type of bearing on a supporting frame 74. The drum 71 is positioned beyond and as close as possible to the adjacent drum 16, but neither the belt 15 nor the belt 70 crosses the path of travel of the other. For supporting an article as it turns the corner we provide a roller 75 which is positioned at an angle to the belts 15 and 70 so as to bisect the angle between the belts 15 and 70. For guiding articles around the corner we provide an outer guide rail 76 and an inner guide rail 77.

In the corner construction as shown, the outer guide rail 76 includes a straight portion adjacent the belt 70 which merges into a reversibly curved portion adjacent the belt 15 and the inner guide rail 77 is curved substantially throughout its length except for a short straight portion adjacent the belt 15.

The belt 70 is shown as adapted to be driven by the first drum 71 which is adapted to be driven by a bevel gear 78 secured to the drum shaft 73 and in mesh with a similar bevel gear 79 on the shaft 18 of the last drum 16.

In some installations of this device we preferably provide a delivery station in front of the first drum 16 preferably consisting of a plurality of idler rollers 80 which may be supported in any suitable type of bearing on the frame 19. When this delivery station is employed we secure a lever 81 to the shaft 26b, the free end of which extends over the rollers into the path of an article thereon and is provided with a roller 82. When an article such as a box that is being transported on the belt 15 reaches the rollers 80 it engages the lever 81 and moves it outward, thereby actuating the clutch spool 25 to cause the clutch 24 to open and cease driving the conveyer. The box will then remain stationary on the rollers 80 until the operator manually moves it along and past the lever 81, whereupon the coiled spring 25b will move the spool 25 to cause the clutch to close and resume the drive of the conveyer.

From the foregoing description it will be apparent that we have provided an improved conveyer system which is of a novel construction and efficient in operation.

It will be noted from an inspection of Figure 6 that the transverse end of the belt 70 is located substantially in line with the adjacent edge of the belt 15. In this way, an angular space is formed at the transverse ends of the belts. Into this space, the roller 75 projects so as to support the box as it rounds the corner. This roller 75 is of relatively small diameter (see Figure 7) and has its upper face substantially in line with the upper runs of the belts.

Having thus described our invention, what we claim is:

1. In a conveyer system, the combination of a main conveyer line, a lateral conveyer line including two sections, one of said sections being adapted to feed onto said main line and the other of said sections being adapted to feed onto said first named section, means for continuously driving said first named section, and means actuated by an article on the main conveyer line for intermittently operating the other section.

2. In a conveyer system including a main conveyer line and a lateral conveyer line adapted to feed onto said main line, means to drive a portion of said lateral line to continuously feed onto said main line when said main line is operating and means actuated by an article on the main conveyer line to intermittently drive the remainder of said lateral line.

3. In a conveyer system, a main conveyer line, a lateral conveyer line including two independently operable sections arranged end to end, means to drive the one of said lateral sections adjacent said main line to continuously feed onto said main line and means actuated by articles on said main line to intermittently operate the other of said lateral sections.

4. In a conveyer system, the combination of a main conveyer line, lateral conveyer line including two sections, one of said sections being adapted to feed onto said main line and the other of said sections being adapted to feed onto said first named section, means for continuously driving said first named section at a greater speed than the main line, and means actuated by articles on the main line for intermittently operating the other section.

5. In a conveyer system, a main conveyer line, a lateral conveyer line including two independent endless belts arranged end to end, means to drive the one of said lateral sections adjacent said main line, means to intermittently operate the other of said lateral sections and means to control said last mentioned means by an object on said main conveyer line.

6. In a system of transportation, a main conveyer and a lateral conveyer, said lateral conveyer including a feeding section separate from the remainder of the lateral line, said feeding section being driven to feed onto the main line when the main line is operating, and means whereby the operation of the remainder of the lateral line is controlled by an article being transported on the main line.

7. In a conveyer system, a main conveyer line, means to drive said main line, a lateral conveyer line arranged at an angle to, and adapted to feed onto, said main line, said lateral conveyer line including a forward section and a rear section, said forward section operating to feed onto said main line and the other of said sections operating to feed onto said forward section, means for continuously driving said forward section, whereby when said main line is driven said forward section will be driven, and means actuated solely by an article on said main conveyer line to intermittently operate said rear section.

8. In a conveyer system, a main conveyer line including a supporting frame, and comprising a plurality of sets of conveying units, means to drive the first unit from a source of power and means connecting each preceding unit with each succeeding unit whereby they are driven, a plurality of lateral conveyer lines adapted to feed onto said main line, each of said lateral lines including a supporting frame and two units, means connecting the first lateral unit with the driving means of said main line whereby when said main line is operating the first unit of each of said lateral lines will be continuously driven, means to drive the second unit of each of said lateral lines, and means projecting into the path of travel of articles on said main line to control said last mentioned means.

9. In a conveyer system, a main conveyer line including a supporting frame, and comprising a plurality of sets of conveying units, means to drive the first unit from a source of power and means connecting each preceding unit with each succeeding unit whereby they are driven, a plurality of lateral conveyer lines adapted to feed onto said main line, each of said lateral lines including a supporting frame and two units, means connecting the first lateral unit with the driving means of said main line whereby when said main line is operating the first unit of each of said lateral lines will be continuously driven, a clutch mechanism associated with the driving means of each of said first lateral units, means adapted to be driven by said clutch and adapted to drive the second unit of each of said lateral lines, means to normally urge said clutches to a position to drive said second lateral unit, a pivoted bar adjacent each of said lateral lines and adapted to extend into the path of travel of articles on said main line, each of said bars being connected to one of said clutches whereby when articles on said main line engage and move said bars said clutches will be moved to a position to cease driving said second units of said laterals.

10. In a conveyer system, a main conveyer line including a supporting frame and comprising a plurality of sets of conveying units, each of said units including an endless belt, said belts being arranged end to end and each of said belts being positioned on a pair of spaced drums, said drums being supported on said frame, means to drive the first drum of the first unit from a source of power, and means connecting the last drum of each preceding unit with the first drum of each succeeding unit whereby they are driven, a plurality of rollers positioned intermediate the drum of each unit and adapted to support the belt connecting said drums and a roller positioned between the adjacent drums of each unit, a plurality of lateral conveyer lines adapted to feed onto said main line, each of said lateral lines including a supporting frame and two endless belt units, each of said lateral belts being positioned on a pair of spaced drums and said drums being supported on said lateral frame, rollers positioned intermediate the drums of each of said lateral units adapted to support said belts, and a roller positioned between the last drum of the first unit and the first drum of the second unit of said lateral line, means connecting said first drum of the first lateral unit with the driving means of said main line whereby when said main line is operating the first unit of each of said lateral lines will be continuously driven, a clutch mechanism associated with the driving means of each of said first lateral units, means adapted to be driven by said clutch and adapted to drive the second unit of each of said lateral lines, means to normally urge said clutches to a position to drive said second lateral units, a pivoted bar adjacent each of said lateral lines and adapted to extend into the path of travel of articles on said main line, each of said bars being connected to one of said clutches whereby when articles on said main line engage and move said bars, said clutches will be moved to a position to cease driving said second units of said laterals.

11. In apparatus of the kind described, the combination of a continuously driven main conveyer, a driven lateral conveyer having its discharge end adjacent to the main conveyer, automatic means controlled by an article advancing on the main conveyer for temporarily discontinuing the driving of the lateral conveyer to delay articles advancing on the lateral conveyer that might collide with the said article advancing on the main conveyer, and continuously driven means including a driven member immediately adjacent the delivery end of the lateral conveyer, and located between the discharge end of the lateral conveyer and the main conveyer for supporting part of the weight of, and for advancing, any article that might otherwise be left standing by the arrest of the drive of the lateral conveyer, and projecting beyond the end of the lateral conveyer.

12. In apparatus of the kind described, the combination of a continuously driven main conveyer, a driven lateral conveyer having its discharge end adjacent to the main conveyer, means for driving the lateral conveyer including a clutch, automatic means for opening the clutch controlled by an article advancing on the main conveyer for temporarily discontinuing the driving of the lateral conveyer to delay articles advancing on the lateral conveyer that might collide with the said article advancing on the main conveyer, and continuously driven means including a driven member immediately adjacent the delivery end of the lateral conveyer, and located between the discharge end of the lateral conveyer and the main conveyer for advancing any article that would otherwise be left standing by the arrest of the drive of the lateral conveyer, and projecting beyond the end of the lateral conveyer.

13. In apparatus of the kind described, the combination of a continuously driven main conveyer, a shaft extending longitudinally therewith, a lateral conveyer with means for driving the same from said shaft including a clutch, automatic means for opening said clutch controlled by an article advancing on the main conveyer for temporarily discontinuing the driving of the lateral conveyer to delay articles advancing on the same that might collide with the said article advancing on the main conveyer, continuously driven means between the discharge end of the lateral conveyer and the main conveyer for advancing any article that would otherwise be left standing on the continuously driven means by the arrest of the drive of the lateral conveyer, and means for driving said continuously driven means from the said shaft.

14. In apparatus of the kind described, the combination of a continuously driven main conveyer, a lateral conveyer having its discharge end adjacent to the main conveyer, automatic means controlled by an article advancing on the main conveyer for stopping the lateral conveyer to delay articles advancing on the same into the intersection with the main conveyer, intermediate conveyer means located in longitudinal alinement with the lateral conveyer and located between the discharge end of the lateral conveyer and the main conveyer so as to support part of the weight of an article on the end of the lateral conveyer and projecting beyond the end of the lateral conveyer, and means other than the article for positively driving the intermediate conveyer means to effect the advance of any article projecting onto the same when the lateral conveyer stops.

15. In apparatus of the kind described, the combination of a continuously driven main conveyer, a lateral conveyer having its discharge end adjacent to the main conveyer, automatic means controlled by an article advancing on the main conveyer for stopping the lateral conveyer to delay articles advancing on the same into the intersection with the main conveyer, and conveyer means including a driven member immediately adjacent the delivery end of the lateral conveyer for supporting part of the weight of an article projecting beyond the lateral conveyer and located between the discharge end of the lateral conveyer and the main conveyer, with means for positively driving the same to advance any article projecting onto the same that would otherwise be left standing by the stopping of the lateral conveyer.

In testimony whereof, we hereunto affix our signatures.

FRANK B. ROBERTS.
WILLIS G. HUNTINGTON.